3,640,919
FOAMED POLY-1-BUTENE
Alfred Michels, Marl, and Josef Bittscheidt, Datteln, Germany, assignors to Chemische Werke Huls Aktiengesellschaft, Marl, Germany
Filed May 12, 1969, Ser. No. 823,541
Claims priority, application Germany, May 30, 1968,
P 17 69 486.9
Int. Cl. C08f 29/02, 47/10
U.S. Cl. 260—2.5 HA  4 Claims

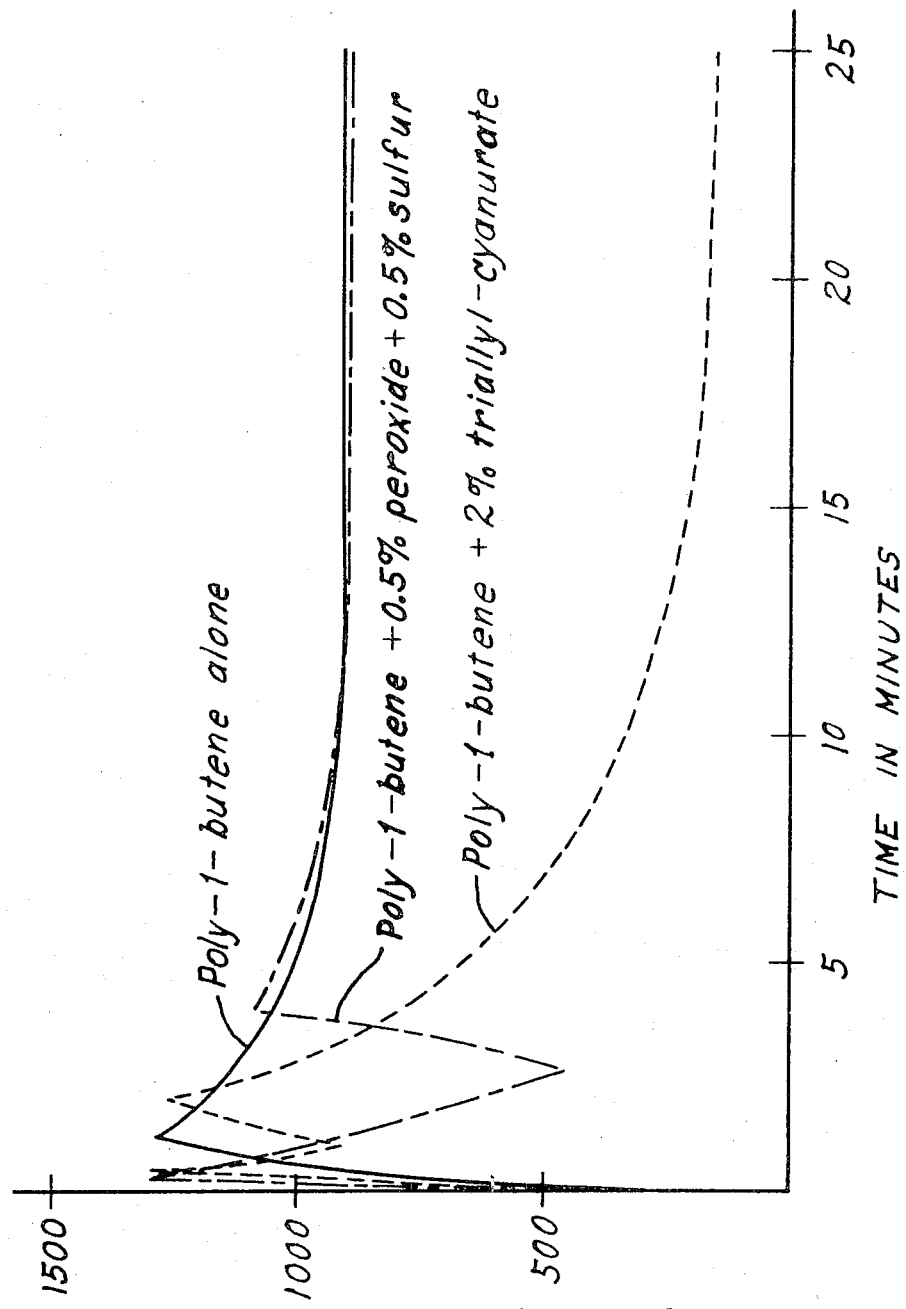

ABSTRACT OF THE DISCLOSURE

An improvement in the process of a foaming poly-1-butene by mixing it with a nitrogen liberating foaming agent, an organic peroxide with a decomposition temperature of at least 170° C., elementary sulfur and an organic compound containing a plurality of allyl groups.

BACKGROUND OF THE INVENTION

The field of the invention is foamed olefin polymers and the present invention relates to an improvement in the process for foaming poly-1-butene by expansion of a previously warmed mixture containing a foaming agent.

The state of the prior art may be ascertained by reference to German printed specifications 1,155,903; 1,181,-406; and 1,237,780, and by reference to the Kirk-Othmer "Encyclopedia of Chemical Technology," 2nd ed., vol. 3 (1964), pages 830–865, under the section "Butylenes," particularly pages 832–833 and 846–855; vol. 9 (1966), pages 847–884, under the section "Foamed Plastics," particularly pages 853, and 855; and vol. 14 (1967), pages 217–313, under the section "Olefin Polymers," particularly pages 309–313.

In vol. 3 of Kirk-Othmer, the nomenclature and physical properties of 1-butene are disclosed on page 832 and the polymerization reactions therefore are disclosed on page 846.

As examples of decomposable blowing agents used for expandible polyethylene, vol. 9 of Kirk-Othmer, discloses at page 853 Azodiacarbonamide, 4,4'-oxybis (benzenesulphon hydrazide), and dinitrosopentamethylene tetramine. Beginning at page 855 of vol. 9, Decompression Expansion Processes are disclosed. Cellular polyolefins, such as polyethylene and polypropylene, in the density range 30–50 pounds per cubic foot are prepared by mixing a decomposable blowing agent with the polymer and feeding the mixture under pressure through an extruder at a temperature such that the blowing agent is partially decomposed before it emerges from the orifice into a lower pressure zone. Simultaneous expansion and cooling take place, resulting in a stable cellular structure as disclosed in the S.P.E. Journal, vol. 18, page 77 (1962); British Plastics, vol. 35 (No. 7), page 349 (1962); and Modern Plastics, vol. 31 (No. 7, page 99 (1954).

Volume 14 of Kirk-Othmer discloses, at pages 309–313, the state of the art of poly-1-butene. On page 309 it is stated that the catalysts for poly-1-butene are the Ziegler-Natta catalysts where a typical example is the interacted product resulting from mixing equimolar quantities of titanium tetrachloride and triethyl aluminum. Table I on page 311 gives the molecular weight relations of poly-1-butene. Poly-1-butene in the commercial product, is highly crystalline and is probably inostatic in form. When the polymer is cooled from the melt, it exists first in the tetragonal form with the melting point range of 120–126° C. It is transformed to the more stable rhombohedral form with a melting point of about 130° C. after standing at room temperature for several days. This polymer has attractive rheological behavior in that its melt flow rate is much faster under given conditions than other polycrystalline materials of a given molecular weight. Poly-1-butene has excellent resistance to environmental stress cracking, good impact strength, and a moderately high stiffness level. The commercial product is useful in film, wire coating and pipe.

During the production of foamed polyolefins a difficulty has been encountered generally. In the temperature range in which the processing must be carried out, the polymers flow much too easily. Since in the polyolefins (in contrast e.g. to polystyrene) the optimum flow viscosity does not coexist with a sufficiently small flow ability, it is possible during the cooling period for the gaseous phase to escape from the polymers and for the foam to collapse.

To avoid this difficulty, it has been suggested in German printed specification 1,155,903 to foam a mixture of polyethylene and polystyrene. According to German printed specification 1,181,406 it is possible, without changing the softening point, to lower the extrusion temperature by adding fatty acid soaps as lubricants to the polyethylene. Finally, according to German printed specification 1,237,780, a mixture of polyethylene with butyl rubber and polyisobutylene is foamed during simultaneous vulcanization of the butyl rubber, whereby the flow behavior of the mixture is changed.

In no prior art case was it possible to produce a satisfactory product from pure polyolefins.

SUMMARY OF THE INVENTION

Having in mind the limitations of the prior art, it is an object of the present invention to greatly lower the flowing ability of the poly-1-butene while at the same time maintaining the low flow viscosity that is needed for processing, so that a foam is produced which remains stable even at a warm temperature.

This problem is solved in the present invention by adding to the mixture of poly-1-butene, besides about 0.1 to 5% by weight (based on the polymer) of a nitrogen releasing foaming agent, also about 0.03 to 2% by weight of an organic peroxide with a decomposition temperature of at least 170° C., about 0.01 to 1.0% by weight sulfur and about 0.5 to 3% by weight of a compound containing several allyl groups.

A poly-1-butene especially suitable for the purposes of the present invention is for example one that is obtained by the Ziegler-Natta low pressure method. The average molecular weight of the polymer is between about 2.0 and 2.5 million, but the invention is not confined to these limits.

Suitable nitrogen releasing foaming agents are for example benzene-1,3-disulfohydrazide, diphenylsulfone-3,3-disulfohydrazide, dinitroso-pentamethylene-tetramine and azodicarbonamide.

Suitable organic peroxides with decomposition temperatures of at least 170° C. are for example the cyclic derivatives of 2,5-dimethyl-2,5-peroxide hexanes such as cyclic perketals of acetone and 2,5-dimethyl-2,5-peroxide hexane.

In carrying out the decompression expansion process of the present invention the mixture is heated to a temperature of about 180 to 220° C. under a pressure of more than 2000 lbs./sq. in., especially of about 2000 to 3500 lbs./sq. in., cooled to a temperature of about 80 to 120° C. and decompressed at atmospheric pressure to expand the polymer.

The compound with a plurality of groups has the following general formula:

$$R[CH_2-CH=CH_2]_x$$

wherein R is the residue of an inorganic acid, or a carboxylic acid having 4-12 carbon atoms, or any organic radical else which is able to form a compound with the allyl group, and $x$ is a whole number from 1 to 4.

Specific examples of the compound containing a plurality of allyl groups are: triallyl phosphate, diallyl monosodium phosphate, diallyl monopotassium phosphate, monoallyl disodiumphosphate, monoallyl dikalium phosphate, monoallyl calciumphosphate, diallyl phosphate, monoallyl phosphate; allyl benzoate; diallyl o-phthalate, diallyl m-phthalate, diallyl p-phthaate; monoallyl o-phthalate, monoallyl m-phthalate, monoallyl p-phthalate; mono-, di, or triallyl benzene tricarboxylic acid ester; mono-, di-, tri-, or tetraallyl pyromellitic acid ester; diallyl adipate, decane dicarboxylic acid diallyl ester; triallyl cyanurate and diallyl barbiturate.

The foaming agent is added in amounts of about 0.1 to 5, preferably 0.5 to 4.5% by weight, the peroxide in amounts of about 0.03 to 2, preferably 0.04 to 1.0%, the allyl compound in amounts of about 0.5 to 3.0, preferably 1 to 2% and the sulfur in amounts of about 0.01 to 1.0, preferably 0.02 to 0.5%. If the mixture is foamed in a frame, then larger amounts are used than for example in an extruder, because in the extruder it is not desired to have too much cross linking which causes too much friction.

BRIEF DESCRIPTION OF THE DRAWING

The figure of the drawing is a graphical relationship of the results of a Plastograph PL3S with viscosity as the ordinate and the time in minutes as the abscissa at a turning moment melting point of 180° C. for poly-1-butene alone as line 1, poly-1-butene +2% peroxide as line 2, and poly-1-butene +0.5% peroxide, 0.5% sulfur and 2% triallyl cyanurate as line 3.

DESCRIPTION OF THE PREFERRED EMBODIMENTS

Examples of the compounds used in the overall composition having 89-99.36% by weight poly-1-butene, 0.1-5.0% by weight foaming agent, 0.03-2.0% by weight organic peroxide, 0.01-1.0% by weight sulfur and 0.5-3.0% by weight allyl compound include:

Poly-1-butene, azodicarbonamide, cyclic perketals of 2,5-dimethyl-2,5-peroxide hexane, sulfur and triallyl cyanurate; poly-1-butene, benzene-1,3-disulfohydrazide, the cyclic perketal of acetone and 2,5-dimethyl-2,5-peroxide hexane, sulfur and triallyl phosphate, wherein the benzene-1,3-disulfohydrazide may be replaced by diphenylsulfone-3,3-disulfohydrazide or by dinitroso-pentamethylenetetramine; poly-1-butene, azodicarbonamide, the cyclic perketal of acetone and 2,5-dimethyl-2,5-peroxide hexane, sulfur and diallyl o-phthalate, wherein the diallyl o-phthalate may be replaced by diallyl m-phthalate, diallyl p-phthalate, monoallyl monosodium o-phthalate, monoallyl monopotassium p-phthalate, diallyl phosphate, diallyl monosodium phosphate, monoallyl phosphate, monoallyl monocalcium phosphate, allyl benzoate, mono-, di-, or triallyl benzenetricarboxylic acid ester, mono-, di-, tri-, or tetraallyl pyromellitic acid ester, diallyl adipate, decanedicarboxylic acid diallyl ester, or diallyl barbiturate.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

Example 1

A mixture consisting of 100 parts by weight of poly-1-butene powder, 0.6 part cyclic perketals of 2,5-dimethyl-2,5-peroxide-hexane, 0.2 part sulfur, 2.0 parts triallyl cyanurate and 4 parts azodicarbonamide are filled into an inclined frame measuring 200 x 200 x 8 mm. The inclined frame which has a closed bottom is equipped with a cover that forms a sealed closure with a groove. In order to build up a sufficient internal pressure while being warmed and to maintain an adequate seal in the groove, the frame is filled with an overdose of about 10%. In a hydraulic molding press having platens with means for cooling and heating the filled-in mixture is then compressed 5 minutes at 200° C. under a pressure of about 3500 lbs./sq. in. The press is cooled to 110° C. and a foamed substance with a density of 70 kg./m.³ is formed at the moment when the pressure is released.

When this example is repeated with poly-1-butene which contains only the foaming agent, the flow viscosity at the moment of pressure release is too low. The cell walls then become disrupted and the foaming gas escapes uncontrolled.

Example 2

A previously granulated mixture, consisting of 100 parts poly-1-butene, 0.05 part peroxide of Example 1, 0.02 part sulfur, 1.0 part triallyl cyanurate and 1.0 part azodicarbonamide, is extruded from a single screw extruder having a profile temperature range: 185, 210, 220, 180° C. The foaming occurs during exit from the nozzles. Densities of 200 to 300 kg./m.³ are obtained, depending on which foaming agent is used, on the temperature range and the rate of extrusion.

The foamable mixture of this invention is worked up either into an intimately mixed powder, possibly with pregranulation at 130° C., or into the form of an agglomerate. It is desirable that the mixture should be capable of being fed into and foamed in any of the usual plastics molding machines.

The poly-1-butene appears to be first decomposed by the organic peroxide and in a parallel reaction with the sulpfur and the triallyl cyanurate it is reassembled into larger molecules which will have entirely different physical and chemical properties and with viscosities that are suitable for foam formation but with entirely different flow characteristics, the poly-1-butene having become more tenacious. This is surprising because the flow viscosity has apparently remained unchanged. In reality, however, the flow viscosity, as explained above, has suffered first a diminution and then an increase, so that its return to the original viscosity is surprising.

In comparison tests with a Brabender plastograph as disclosed in "Kunststoffe" 41, pages 23 to 29 (1951) and in "Kunststoffe" 42, pages 142 to 148 (1952) it has been found that at 180° C. poly-1-butene which is not cross-linked will flow, whereas that which is cross-linked has rubber-like elasticity. The figure shows in curve 1 the behavior of the pure poly-1-butene which after the initial increase of viscosity, finally acquires a constant viscosity because of insufficient internal heating of the material, the graph showing the gel-production in mkg./minute.

When the poly-1-butene is mixed with 2% by weight of peroxide, there is considerably less gelling because of decomposition of the polymer (curve 2), whereas if a mixture of 100 parts poly-1-butene, 0.5% peroxide, 0.5% sulfur and 2% triallyl cyanurate is used as in Example 1, then the curve (curve 3) after an initial momentary drop follows the same course as curve 1.

In other words, poly-1-butene retains its workability, even though it is no longer fluid but instead has a rubber-like elasticity.

Also the following values of physical characteristics show the complete agrement in the flow viscosity (a) to (c), but with very different solubility in toluene, of pure poly-1-butene with poly-1-butene which has been crosslinked as in Example 1 (without foaming agent):

|  | Pure poly-1-butene | Poly-1-butene, Example 1 (without foaming agent) |
|---|---|---|
| (a) I₅ value (gr./10 minutes) | 0.25 | 0.23 |
| (b) N−red (0.1 gr.) | 4.17 | 4.00 |
| (c) Capillary viscosimeter | (¹) | (¹) |
| (d) Solubility 4ʰ in boiling toluene (soluble portion), percent | 52.9 | 12.2 |

¹ No difference.

We claim:
1. A foamable polyolefin composition consisting essentially of about 89.0–99.36 percent by weight poly-1-butene, about 0.1–5.0 percent by weight nitrogen liberating organic foaming agent, about 0.03–2.0 percent organic peroxide with a decomposition temperature of at least 170° C., about 0.01–1.0 percent by weight sulfur and about 0.5–3 percent by weight of a compound containing a plurality of allyl groups selected from the group consisting of triallyl phosphate, diallyl monosodium phosphate, diallyl monopotassium phosphate, diallyl phosphate, diallyl o-phthalate, diallyl m-phthalate, diallyl p-phthalate; di-, or triallyl benzene tricarboxylic acid ester; di-, tri-, or tetraallyl pyromellitic acid ester; diallyl adipate, decane dicarboxylic acid diallyl ester; triallyl cyanurate and diallyl barbiturate.

2. The composition of claim 1, wherein the parts by weight are 92.0–98.44% poly-1-butene, 0.5–4.5% foaming agent, 0.04–1.0% organic peroxide, 0.02–0.5% sulfur and 1.0–2.0% of the compound containing a plurality of allyl groups.

3. The composition of claim 2, wherein said nitrogen liberating foaming agent is selected from the group consisting of benzene-1,3-disulfohydrazide, diphenylsulfone-3,3-disulfohydrazide, dinitroso - pentamethylenetetramine and azodicarbonamide.

4. A process for foaming poly-1-butene comprising heating under a pressure greater than atmospheric and a temperature greater than 170° C. a mixture consisting essentially of in percent by weight about 89.0–99.36 poly-1-butene, about 0.1–5.0 nitrogen liberating foaming agent, about 0.03–2.0 of an organic peroxide with a decomposition temperature of at least 170° C., 0.01–1.0 sulfur and 0.5–3.0 of a compound containing a plurality of allyl groups, cooling the molten mixture and decompressing the mixture to expand the polymer, said compound containing a plurality of allyl groups having the general formula $R[CH_2-CH=CH_2]_x$ wherein R is the residue of an inorganic acid, a carboxylic acid having 4–12 carbon atoms, or an organic radical having 4–12 carbon atoms, which forms compounds with the allyl group and $x$ is a whole number from 2 to 4.

References Cited

UNITED STATES PATENTS

| 3,546,326 | 12/1970 | Seifert et al. | 260—2.5 E |
| 2,927,904 | 3/1960 | Cooper | 260—2.5 |
| 3,296,184 | 1/1967 | Portolani et al. | 260—94.9 G-O |

MURRAY TILLMAN, Primary Examiner
W. J. BRIGGS, SR., Assistant Examiner

U.S. Cl. X.R.

260—79.5 C, 93.7, 94.9 GA, 878 R, 2.5 E